United States Patent
Bendre et al.

(10) Patent No.: US 10,270,646 B2
(45) Date of Patent: Apr. 23, 2019

(54) SYSTEM AND METHOD FOR RESOLVING MASTER NODE FAILURES WITHIN NODE CLUSTERS

(71) Applicant: ServiceNow, Inc., Santa Clara, CA (US)

(72) Inventors: Nikhil Bendre, San Diego, CA (US); Jared Laethem, Carlsbad, CA (US)

(73) Assignee: SERVICENOW, INC., Santa Clara, CA (US)

( * ) Notice: Subject to any disclaimer, the term of this patent is extended or adjusted under 35 U.S.C. 154(b) by 158 days.

(21) Appl. No.: 15/332,558

(22) Filed: Oct. 24, 2016

(65) Prior Publication Data
US 2018/0115456 A1    Apr. 26, 2018

(51) Int. Cl.
*H04L 12/24* (2006.01)
*H04L 12/26* (2006.01)

(52) U.S. Cl.
CPC .......... *H04L 41/0663* (2013.01); *H04L 43/10* (2013.01); *H04L 41/044* (2013.01)

(58) Field of Classification Search
None
See application file for complete search history.

(56) References Cited

U.S. PATENT DOCUMENTS

| | | | |
|---|---|---|---|
| 7,421,478 B1 | 9/2008 | Muchow | |
| 7,483,998 B2 | 1/2009 | Rabinovitch | |
| 7,627,694 B2 | 12/2009 | Sreenivasan et al. | |
| 7,734,960 B2 | 6/2010 | Mandal | |
| 7,856,480 B2 | 12/2010 | Muchow | |
| 9,329,909 B1* | 5/2016 | Khanna | G06F 9/5072 |
| 2003/0177228 A1 | 9/2003 | Vigouroux et al. | |
| 2006/0198386 A1 | 9/2006 | Liu et al. | |
| 2007/0006015 A1 | 1/2007 | Rao et al. | |
| 2009/0049054 A1 | 2/2009 | Wong et al. | |
| 2013/0297970 A1 | 11/2013 | Callaway et al. | |
| 2014/0012721 A1* | 1/2014 | Chittigala | G06F 9/50 705/35 |

(Continued)

OTHER PUBLICATIONS

Szpuszta, Mario et al.; "Microsoft Azure—Fault Tolerance Pitfalls and Resolutions in the Cloud", MSDN Microsoft Magazine, Developer Network, Sep. 2015, vol. 30, No. 9, downloaded Oct. 18, 2016, https://msdn.nicrosoft.com/en-us/magazine/mt422582.aspx, 10 pp.

(Continued)

*Primary Examiner* — Nicholas Sloms
(74) *Attorney, Agent, or Firm* — Fletcher Yoder PC

(57) ABSTRACT

Fault tolerance techniques for a plurality of nodes executing application thread groups include executing at least a portion of a first application thread group based on a delegation by a first node, wherein the first node delegates an execution of the first application thread group amongst the plurality of nodes and has a highest priority indicated by an ordered priority of the plurality of nodes. A failure of the first node can be identified based on the first node failing to respond to a message sent to it. A second node can then be identified as having a next highest priority indicated by the ordered priority such that the second node can delegate an execution of a second application thread group amongst the plurality of nodes.

20 Claims, 7 Drawing Sheets

(56) References Cited

U.S. PATENT DOCUMENTS

2014/0241724 A1* 8/2014 McGarry ........... H04Q 11/0067
398/67
2015/0370657 A1* 12/2015 Marakala ............ G06F 11/1484
714/15

OTHER PUBLICATIONS

Hui, Kenneth, "Dealing With Persistent Storage and Fault Tolerance in Apache Mesos", Cloud Architect Musings, Musings on Cloud Computing and Cloud Native Applications, Mar. 31, 2015, downloaded Oct. 18, 2016, https://cloudarchitectmusings.com/2015/03/31/dealing-with-persistent-storage-and-fault-tolerance-in-apache-mesos/, 10 pp.

Hadoop, "Zookeeper Recipes and Solutions", A Guide to Creating Higher-Level Constructs With ZooKeeper, Last Published: Jul. 20, 2016, downloaded Oct. 18, 2016, https://zookeeper.apache.org/doc/trunk/recipes.html, 7 pp.

McGary, Sean, "How to Build a Fault-Tolerant Redis Cluster With Sentinel", Jul. 9, 2015, downloaded Oct. 18, 2016, https://seanmcgary.com/posts/how-to-build-a-fault-tolerant-redis-cluster-with-sentinel, 12 pp.

SCYLD Clusterware HPC; "Master Node Failure", Administrator's Guide, Managing Node Failures, Date Unknown, downloaded Oct. 18, 2016, http://gilgamesh.cheme.cmu.edu/scyld-doc/administration-guide/x2270.html, 1 p.

Boner, Jonas, "Distributed Computing Made Easy", Published May 1, 2006, downloaded Oct. 18, 2016, http://www.theserverside.com/news/1365083/Distributed-Computing-Made-Easy, 9 pp.

Splunk Enterprise, "Managing Indexers and Clusters of Indexers", Replace the Master Node on the Indexer Cluster—Splunk Knowledgebase, Version 6.2.0, Date Unknown, downloaded Oct. 18, 2016, http://docs.splunk.com/Documentation/Splunk/6.2.0/Indexer/Handlemastemodefailure, 3 pp.

Duanple Blog, "Load Balancer", Loiter, May 7, 2011, downloaded Oct. 18, 2016, http://duanple.blog.163.com/blog/static/7097176720114741728720/, 5 pp.

Ketema, Jeroen, "Fault Tolerant Master-Slave Replication and Recovery in Globe", Mar. 2, 2001, downloaded Oct. 18, 2016, http://www.ketema.eu/publ/scriptie.pdf, 68 pp.

* cited by examiner

| NODE ID | TIME REGISTERED | ACCESSIBLE | MASTER |
|---|---|---|---|
| dc03_sv12_nd01 | 20161015_09:36:12 | Y | Y |
| dc03_sv12_nd02 | 20161015_09:36:13 | Y | N |
| dc03_sv12_nd03 | 20161015_09:37:28 | N | N |
| dc03_sv12_nd04 | 20161015_09:39:07 | Y | N |

FIG. 4

SYSTEM AND METHOD FOR RESOLVING MASTER NODE FAILURES WITHIN NODE CLUSTERS

TECHNICAL FIELD

This disclosure relates in general to systems and methods for resolving master node failures within node clusters in an electronic computing and communications system.

BACKGROUND

An electronic computing and communications system can include one or more communicating and computing elements, which can, in the course of communicating and computing, process information using nodes at a datacenter. Commands can be delegated to individual nodes for processing under the purview of logic implemented within the datacenter. Delegation of commands in the event of a failure of one or more nodes, however, presents a potential failure point for such a system.

SUMMARY

Disclosed herein are implementations of systems and methods for resolving master node failures within node clusters.

In an implementation, a fault tolerance system is provided for a plurality of nodes executing a plurality of application thread groups in a datacenter having a database, wherein the database stores status information for each of the nodes including an indication of an ordered priority of the plurality of nodes. The system comprises a memory and a processor. The memory includes instructions executable by the processor to execute at least a portion of an application thread group based on a delegation by a first node, wherein the first node delegates an execution of the application thread group amongst the plurality of nodes and has a highest priority indicated by the ordered priority. The memory further includes instructions executable by the processor to send a message to the first node. The memory further includes instructions executable by the processor to identify a failure of the first node based on the first node failing to respond to the message. The memory further includes instructions executable by the processor to update status information for the first node in the database based on the identified failure of the first node. The memory further includes instructions executable by the processor to identify, in the database, a second node having a highest priority indicated by the ordered priority except for the failed first node and any other failed nodes, wherein the second node delegates the execution of the application thread group or an execution of a new application thread group amongst the plurality of nodes. The memory further includes instructions executable by the processor to execute at least a portion of the application thread group or the new application thread group based on a delegation by the second node.

In an implementation, a fault tolerance method is provided for a plurality of nodes executing a plurality of application thread groups in a datacenter having a database, wherein the database stores status information for each of the nodes including an indication of an ordered priority of the plurality of nodes. The method comprises executing at least a portion of an application thread group based on a delegation by a first node, wherein the first node delegates an execution of the application thread group amongst the plurality of nodes and has a highest priority indicated by the ordered priority. The method further comprises sending a message to the first node. The method further comprises identifying a failure of the first node based on the first node failing to respond to the message. The method further comprises updating status information for the first node in the database based on the identified failure of the first node. The method further comprises identifying, in the database, a second node having a highest priority indicated by the ordered priority except for the failed first node and any other failed nodes, wherein the second node delegates the execution of the application thread group or an execution of a new application thread group amongst the plurality of nodes. The method further comprises executing at least a portion of the application thread group or the new application thread group based on a delegation by the second node.

In an implementation, a non-transitory computer-readable storage medium is provided, comprising executable instructions that, when executed by a processor, facilitate the performance of operations for fault tolerance for a plurality of nodes executing a plurality of application thread groups in a datacenter having a database, wherein the database stores status information for each of the nodes including an indication of an ordered priority of the plurality of nodes. The operations comprise executing at least a portion of an application thread group based on a delegation by a first node, wherein the first node delegates an execution of the application thread group amongst the plurality of nodes and has a highest priority indicated by the ordered priority. The operations further comprise sending a message to the first node. The operations further comprise identifying a failure of the first node based on the first node failing to respond to the message. The operations further comprise updating status information for the first node in the database based on the identified failure of the first node. The operations further comprise identifying, in the database, a second node having a highest priority indicated by the ordered priority except for the failed first node and any other failed nodes, wherein the second node delegates the execution of the application thread group or an execution of a new application thread group amongst the plurality of nodes. The operations further comprise executing at least a portion of the application thread group or the new application thread group based on a delegation by the second node.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIG. 4 is an illustration of an example of a database table for storing information about registered nodes of a node cluster in accordance with implementations of this disclosure.

DETAILED DESCRIPTION

Figure 1:
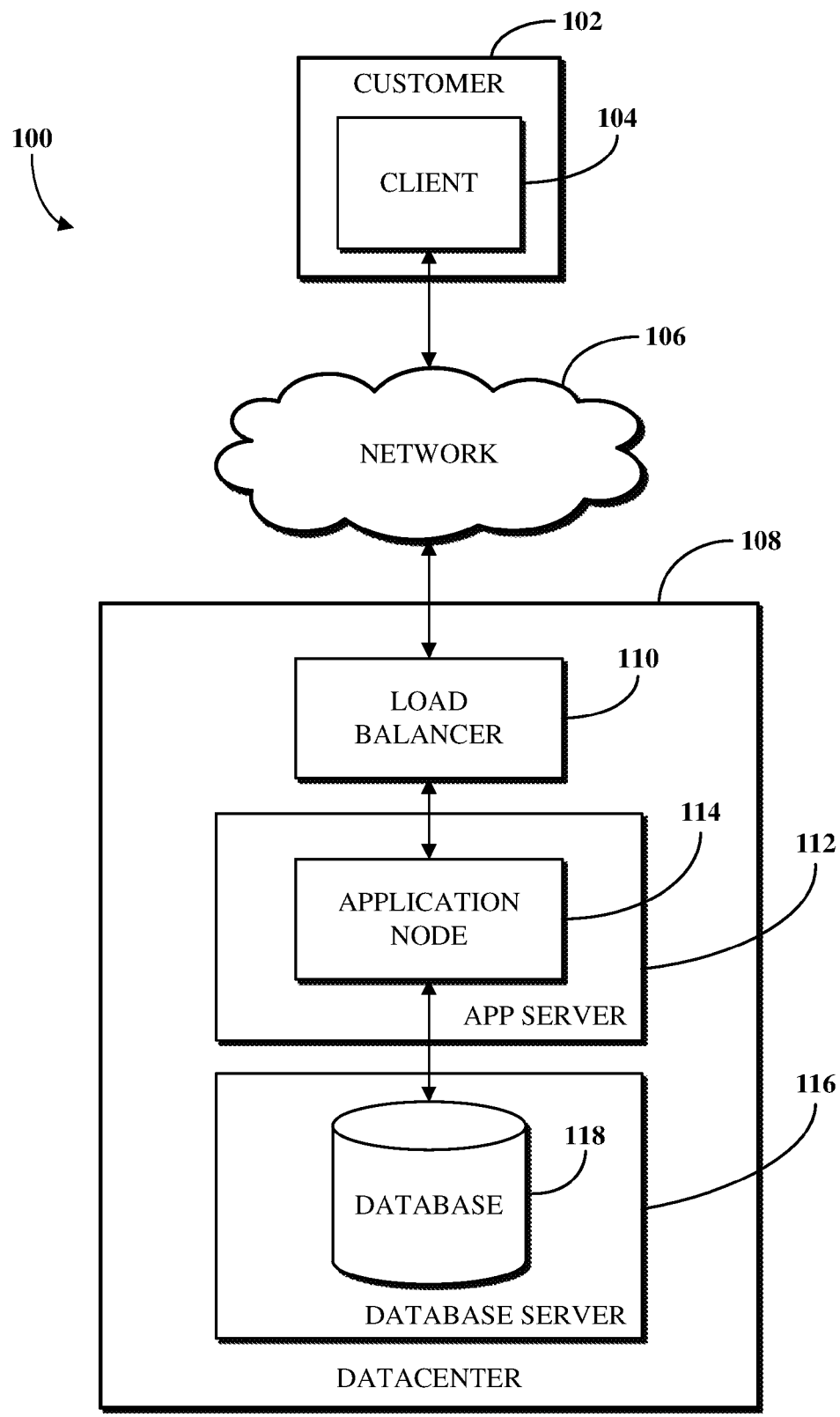
FIG. 1 is a block diagram of an example of an electronic computing and communications system.

A datacenter can include a number of nodes that can be implemented by application or operating system software executed by a server device. Software executed within a datacenter can include a cluster of nodes for processing different portions of the software instructions. The cluster, also referred to as a node cluster, can include multiple nodes each tasked with processing different threads in connection with the execution of an application. To facilitate efficient processing and reduce redundancies, one node of the node cluster can be designated as a master node configured to delegate the threads to the nodes of the node cluster for execution. For example, when an event occurs that presents a batch of threads for execution, the master node can determine how to delegate threads amongst the nodes of the respective cluster.

The master node can at some point experience a failure preventing it from delegating the threads. For example, the physical server on which the master node is executed can experience a hardware or power failure. If this occurs, another node of the node cluster should be designated as the new master node to take over the thread delegation for the node cluster. A fault tolerance mechanism can be implemented within the datacenter to determine the next node to designate as the new master node. However, such a fault tolerance mechanism can consume significant system resources of the datacenter while determining the next node to be designated. One example of such a fault tolerance mechanism includes logic for individually polling all of the nodes of the node cluster for master node recommendations and reconciling the recommendations to elect a new master node. In such an approach, the polling logic and reconciliation logic both draw system resources away from the delivery of services to client devices connected to the datacenter, but the datacenter systems cannot determine the new master node without polling and reconciling the recommendations from the individual nodes.

Alternatively, in an implementation of the present approach, master node failures within a node cluster can be resolved using a centralized database in communication with the nodes of the node cluster. The nodes periodically send status requests to one another to determine whether the other nodes in the node cluster are accessible. The first node can determine that a second node is inaccessible, for example, when the second node does not respond to a status request transmitted by the first node. The centralized database can be queried for status information of the second node to determine whether the second node is designated as the master node of the node cluster. If the status information indicates that the second node is the master node of the node cluster, the first node can cause the centralized database to be queried for an identifier of a candidate master node based on a priority order of the nodes. The first node is designated as the new master node of the node cluster in the event that the identifier of the first node is the identifier of the candidate master node. The priority order of the nodes can indicate an ordered list of next nodes to be designated as a new master node based upon an order in which the nodes registered to the centralized database.

The systems and methods of this disclosure address problems particular to computer networks used for delivering application services using server devices at a datacenter, for example, those concerning the fault tolerance of node clusters. These computer network-specific issues can be resolved by implementations of this disclosure. For example, a master node failure that would otherwise result in threads not being delegated to nodes of a node cluster can be resolved using a centralized database to which the nodes of the node cluster are registered. The implementations of this disclosure thus introduce new and efficient improvements in the ways in which master node failures can be resolved in a computing system by using a centralized database to store information about the node cluster and designating a new master node in the event of a master node failure based on the information stored in the centralized database.

To describe some implementations in greater detail, reference is first made to examples of hardware structures. FIG. 1 is a block diagram of an example of an electronic computing and communications system 100 in accordance with this disclosure. As used herein, the term "electronic computing and communications system," or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device, or combination of computing devices. In some implementations, the client 104 can be implemented as a single physical unit, or a combination of physical units. In some implementations, a single physical unit can include multiple clients.

In some implementations, the client 104 can be an instance of an application running on a customer device associated with the customer 102. As used herein, the term "application" can include, but is not limited to, applications, programs, instances, processes, threads, services, plugins, patches, application version upgrades, or any other identifiable computational aspect. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters and at least some of the datacenters can include hundreds or any suitable number of servers. In some implementations, the datacenter 108 can be associated or communicate with one or more datacenter networks or domains, which can include domains other than the client domain.

In some implementations, the client 104 and the servers associated with the datacenter 108 are configured to connect to, or communicate via, a network 106. In some implementations, a client 104 associated with the customer 102 can connect to the network 106 via a communal connection point, link, or path. In some implementations, a client 104 associated with the customer 102 can connect to, or communicate via, the network 106 using a distinct connection point, link, or path. A connection point, link, or path can be wired, wireless, use other communication technologies, or a combination thereof.

In some implementations, the network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

In some implementations, maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

In some implementations, the datacenter 108 includes an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. In some implementations, any number of application servers or database servers can be implemented at the datacenter 108. In some implementations, the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

In some implementations, the application server 112 can include any suitable number of application nodes depending upon a system load or other characteristics associated with the application server 112. For example, and without limitation, the application server 112 can include two or more nodes forming a node cluster. In some implementations, one application node of the node cluster can be designated as a master node for delegating the execution of threads to the other application nodes of the node cluster. In some implementations, the application nodes implemented on a single application server 112 can run on different hardware servers.

The database server 116 can be configured to store, manage, or otherwise provide data for delivering services to the client 104 over a network. In some implementations, the database server 116 includes a data storage unit, such as a database 118, which can be accessible by an application executed on the application node 114. In some implementations, the database 118 can be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

Some or all of the systems and methods described herein can operate or be executed on or by the servers associated with the system 100. In some implementations, the systems and methods described herein, portions thereof, or combinations thereof, can be implemented on a single device, such as a single server, or a combination of devices, for example, a combination of the client 104, the application server 112, and the database server 116. In some implementations, one or more databases (e.g., the database 118), tables, other suitable information sources, or portions or combinations thereof, can be stored, managed, or otherwise provided by one or more of the elements of the system 100 other than the database server 116, such as the client 104 or the application server 112.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both, can be monitored, controlled, configured, or a combination thereof.

In some implementations, the network 106, one or more datacenters, such as the datacenter 108, and one or more load balancers, such as the load balancer 110, can be implemented within a distributed computing system. In some implementations, a load balancer associated with a distributed computing system (e.g., the load balancer 110) can communicate with the network 106, one or more datacenters (e.g., the datacenter 108), other load balancers, or a combination thereof. In some implementations, the load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. In some implementations, the secondary database can include an exact or substantially exact mirror, copy, or replication of the primary database. In some implementations, the primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database, and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

In some implementations, a distributed computing system can allocate resources of a computer network using a multi-tenant or single-tenant architecture. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers, or customer sub-units. In some implementations, customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

In some implementations, a customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
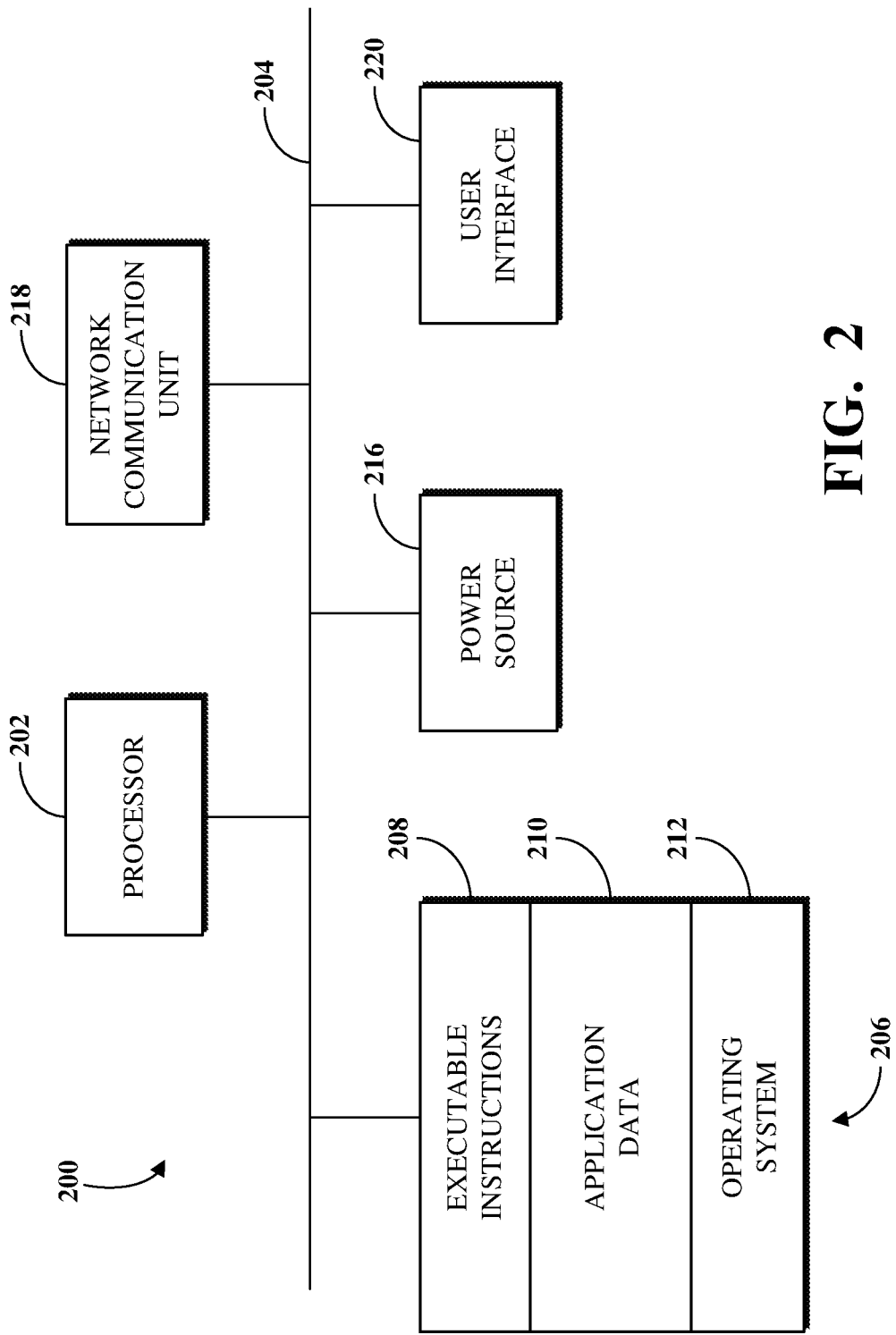
FIG. 2 is a block diagram of an example internal configuration of a computing device of an electronic computing and communication systems.

FIG. 2 generally illustrates a block diagram of an example internal configuration of a computing device 200, such as a client 104 or a server, such as an application server 112 or a database server 116, of the system 100 as generally illustrated in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, a power source 216, a network communication unit 218, a user interface 220, other suitable components or a combination thereof.

The processor 202 can be a central processing unit (CPU), such as a microprocessor, and can include single or multiple processors having single or multiple processing cores. Alternatively, the processor 202 can include another type of device, or multiple devices, now-existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network, such as clients or servers. In some implementations, the processor 202 can include a cache, or cache memory, for local storage of operating data or instructions.

In some implementations, the memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some implementations, the memory 206 can include another type of device, or multiple devices, now-existing or hereafter developed, capable of storing data or instructions for processing by the processor 202. The processor 202 can access or manipulate data in the memory 206 via the bus 204. Although depicted here as a single bus, the bus 204 can be composed of multiple buses, which can be connected to one another through various bridges, controllers, or adapters.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof, to perform various functions described herein. For example, the executable instructions 208 can include instructions to receive requests for status information about nodes executing on a server, transmit responses to the requests, and update data stored in a database (e.g., the database 118). The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or any other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
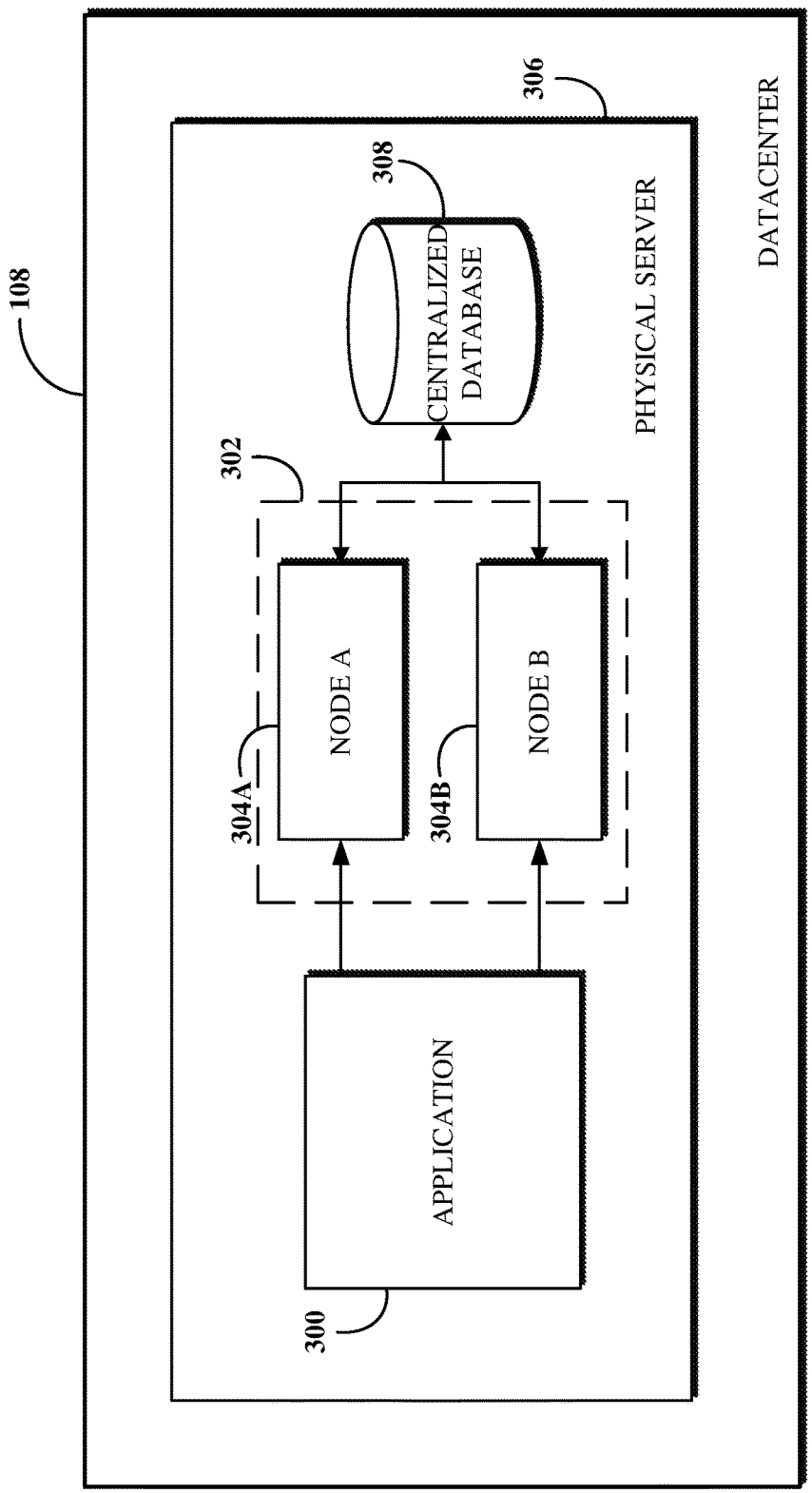
FIG. 3 is a block diagram of an example of an application executing within a datacenter of an electronic computing and communication systems.

FIG. 3 is a block diagram of an example of an application executing within a datacenter of an electronic computing and communications system, such as the system 100. The nodes 304A, 304B are separate processes used to deliver services associated with an application 300 that can have a plural number of nodes associated with it. The nodes 304A, 304B can be generated at the time the application 300 is executed, a time proximate to the execution of the application 300, or another time, for example, during the performance of operations associated with the application 300. In some implementations, the nodes 304A, 304B can be application nodes, such as the application node 114 discussed with respect to the system 100 of FIG. 1. In some implementations, the nodes 304A, 304B can be database nodes used for implementing a database, such as the database 118 discussed with respect to the system 100 of FIG. 1. In some implementations, the nodes 304A, 304B can be other nodes used for processing information, instructions, or commands in connection with the application 300.

The application 300 includes a set of instructions executable by a processor of a computing device, such as the processor 202 of the computing device 200. In some implementations, the application 300 can be an instance of platform software implemented on the system 100. The platform software can be a set of software services deliverable to client devices within the system 100. The instance of platform software can be an individual implementation of the platform software implemented for use by a customer 102 and clients of the customer 102. In some implementations, the application 300 can be virtualization software for instantiating a virtual machine.

In some implementations, the nodes 304A, 304B can be threads or other elements or objects for processing client requests in connection with the application 300. For example, a first node 304A can be a thread for processing a request for a uniform resource locator (URL) at which at least a portion of the application is accessible. As another example, a second node 304B can be a thread for determining characteristics of addressable devices within a customer network. The nodes associated with the application 300 can be represented as a node cluster 302. A node of the node cluster 302 can be designated as the master node for delegating the execution of threads to the other nodes of the node cluster 302. As used herein, the term "application thread group" refers to a collection of one or more threads executable by nodes of the node cluster 302. A thread of an application thread group can be a thread executable in connection with the application 300, software for instantiating the application 300 (e.g., software used to provision the environment in which the application 300 executes on a server of a datacenter, such as the datacenter 108 shown in FIG. 1), database software or instructions associated with a database management system (e.g., an RDBMS), firmware or other system software related to the operation of hardware on which the application 300 or software for instantiating the application 300 executes, or other instructions directly or indirectly associated with the application 300.

The nodes 304A, 304B can be executed by one or more servers within the datacenter 108. For example, in some implementations where the nodes 304A, 304B are application nodes, the nodes 304A, 304B can be executed by one or more application servers, such as the application server 112 discussed with respect to the system 100 of FIG. 1. In another example, in some implementations where the nodes 304A, 304B are database nodes, the nodes 304A, 304B can be executed by one or more database servers, such as the database server 116 discussed with respect to the system 100 of FIG. 1. A server executing a node 304A, 304B can be a distinct host machine operating on a physical server 306 within the datacenter 108. The physical server 306 can be a computing device, such as the computing device 200 of FIG. 2. Where multiple servers are used to execute the nodes of the node cluster 302, the multiple servers can operate on a common physical server or on distinct physical servers.

The nodes 304A, 304B of the node cluster 302 all point to the same database, such as the centralized database 308, for delivering services associated with the application 300. As used herein, the term "centralized database" refers to a single database or a single repository of information for a node cluster; however, the centralized database can be implemented using other database technology, including without limitation distributed database systems.

For example, in some implementations, the centralized database 308 can be the database 118 discussed with respect to the system 100 of FIG. 1. In some implementations, the centralized database 308 can be operated on a database server, such as the database server 116. In some implementations, the database server can be operated on the same physical server 306 as the one or more servers used to execute the nodes 304A, 304B. For example, in some implementations where the nodes 304A, 304B are application nodes executed on one or more application servers, the one or more application servers can operate on the same physical server 306 as the database server operating the centralized database 308. In another example, in some implementations where the nodes 304A, 304B are database nodes executed on one or more database servers, the one or more database servers executing the nodes 304A, 304B can operate on the same physical server 306 as the database server operating the centralized database 308. In some implementations where the nodes 304A, 304B are database nodes executed on one or more database servers, the centralized database 308 can be operated on the same one or more database servers executing the nodes 304A, 304B. In some implementations, the database server 116 can be operated on a physical server other than the physical server operating the one or more application servers used to execute the nodes 304A, 304B.

When a node 304A, 304B is executed, information about the node 304A, 304B is registered to the centralized database 308. The registration can be performed to centrally store information about the nodes of the node cluster 302. In some implementations, registering a node 304A, 304B to the centralized database 308 can include storing information about the node 304A, 304B within a row of a database table of the centralized database 308. For example, upon the execution of the node 304A, a command can be sent to the centralized database 308 to insert a new row in a database table configured to store information about the node 304A. In some implementations, new nodes registered to the centralized database for the node cluster can be added to the database table at any time.

Implementations of the system depicted in FIG. 3 can include additional modules, fewer modules, combined modules, modules with additional or less functionality than those described above, or combinations thereof. For example, in some implementations, the system depicted in FIG. 3 can include a node generation module including instructions for generating individual nodes of a node cluster for separate processes of the application 300. In another example, in some implementations, the system depicted in FIG. 3 can include a failover module including instructions for transmitting a command to register nodes of a secondary datacenter for use in processing data for the application 300 responsive to determining that all nodes capable of processing data for the application 300 within the datacenter 108 are not accessible.

FIG. 4 is an illustration of an example of a database table 400 for storing information about registered nodes of a node cluster in accordance with implementations of this disclosure. The database table 400 is a table of a centralized database, such as the centralized database 308, and is used to store data associated with nodes that have registered to the centralized database. Individual rows in the database table 400 represent a single node registered to the centralized database. In some implementations, a schema of the database table 400 includes columns for storing a node identifier 402, a time-registered timestamp 404, an accessible indicator 406, and a master indicator 408. In some implementations, separate database tables can be used to store data for different node clusters within one or more datacenters.

The node identifier 402 is a character string that can be used to uniquely identify a node. In some implementations, the node identifier 402 can be generated based on one or more of a datacenter at which the node is executed, a physical server on which the node is executed, a server on which the node is executed, or a cardinality of nodes executed on a server including the subject node. In some implementations, the node identifier 402 can be a hashed value generated by hashing a character string representing information about the node. In some implementations, the node identifier 402 can be randomly generated and assigned to represent the corresponding node. The node identifier 402 can take any form, provided that it uniquely represents a single node.

The time-registered timestamp 404 indicates a date or time at which the node registered to the centralized database. In some implementations, the time-registered timestamp 404 can be recorded at the actual time at which the node registered to the centralized database or a time proximate to the actual time, for example, when a request to register the node was received by the centralized database or when the actual registration completed. In some implementations, the time-registered timestamp 404 can be a character string including a four-digit year, two-digit month, and two-digit day to represent the date on which the node was registered. In some implementations, the time-registered timestamp 404 can be a character string including a six-digit time indicating the hour, minute, and second at which the node registered to the centralized database, for example, according to a local time zone within which the corresponding datacenter is located. The time-registered timestamp 404 can be indicated in any format provided that it indicates the date or time at which the node registered to the centralized database.

The accessible indicator 406 indicates whether the node is available for processing threads such that a master node can delegate threads to it and the node will process the threads. The master indicator 408 indicates whether the node is currently designated as the master node of the node cluster. In some implementations, one or both of the accessible indicator 406 or the master indicator 408 can be a flag represented by a "0" if the node is not accessible or not the master node, as applicable, and a "1" if the node is accessible or is the master node, as applicable. In some implementations, one or both of the accessible indicator 406 or the master indicator 408 can be a character variable represented by a "Y" if the node is not accessible or not the master node, as applicable, and an "N" if the node is accessible or is the master node, as applicable. The accessible indicator 406 can be indicated in any format, provided that it accurately indicates whether the node is accessible. The master indicator 408 can be indicated in any format provided that it accurately indicates whether the node is a master node of a corresponding node cluster.

The ordering of row entries within the database table 400 can be indicative of an order in which the nodes registered to the database. As such, data representative of the first node to register to the centralized database is stored within a first row of the database table 400, data representative of the second node to register to the centralized database is stored within a second row of the database table 400, and so on. For example, the four row entries illustrated in FIG. 4 can correspond to nodes A, B, C, and D, respectively. The node A can have the node identifier "dc03_sv12_nd01," indicating that it is the first node to connect on server number twelve at datacenter number three. The node A registered to the centralized database on Oct. 15, 2016, slightly after 9:36 in the morning local time. The node C can have the node identifier "dc03_sv12_nd03," indicating that it is the third node to connect on server number twelve at datacenter number three. The time-registered timestamp for the node C indicates that it registered to the centralized database on Oct. 15, 2016, slightly after 9:37 in the morning local time, which was after the nodes A and B registered to the centralized database. Hence, the node A is represented by data stored in the first row of the database table 400, the node B is represented by data stored in the second row of the database table 400, and the node C is represented by data stored in the third row of the database table 400.

In some implementations, the nodes of the node cluster have an ordered priority for becoming a new master node based on the order in which they registered to the centralized database. For example, by virtue of the node A having been the first node to register in the centralized database for the node cluster, the master indicator for the database table 400 row entry for the node A indicates that the node A is the master node of the node cluster. The first node to register to the centralized database can maintain its designation as the master node unless and until it becomes not accessible, at which time the second node to register to the centralized database is designated as a new master node, provided that the second node is accessible at the time the prior master node becomes not accessible. If the second node to have registered to the centralized database is also not accessible at that time, the third node to have registered to the centralized database can instead be designated as a new master node, and so forth.

For example, in the event that the node B, represented by the node identifier "dc03_sv12_nd02," determines that the node A is not accessible, the database table 400 can be updated to reflect that change by replacing "Y" with "N" in the corresponding row and column. Once the node B determines that the node A is the master node, it can cause the centralized database to be queried to retrieve the node identifier for the node having priority to be the new master node. Because the node B was the second node of the node cluster to have registered with the centralized database, it has the priority after node A to be the master node of the node cluster. In response to the node B determining that its node identifier matches the identifier of the next priority node in the database table 400, the database table 400 can be updated to change the master indicator for the row entries corresponding to the nodes A and B. For example, the master indicator for the node A can be removed such that the value is set to "N," and the master indicator for the node B can be added such that the value is set to "Y."

The database table 400 can be implemented other than as described above and such different implementations may, for example, include additional columns, fewer columns, columns storing data in a manner different from that described above, use of different storage techniques, or combinations thereof. For example, in some implementations, an object-oriented database can be used instead of a relational database. In another example, in some implementations, the database table 400 can include columns including information related to a name of the corresponding node; a last time detected timestamp indicating a date or time at which the corresponding node was last determined to be accessible; a description indicating an application process executed by the node; or any other suitable type of information representative or indicative of the status, function, or other use of a node.

Figure 5:
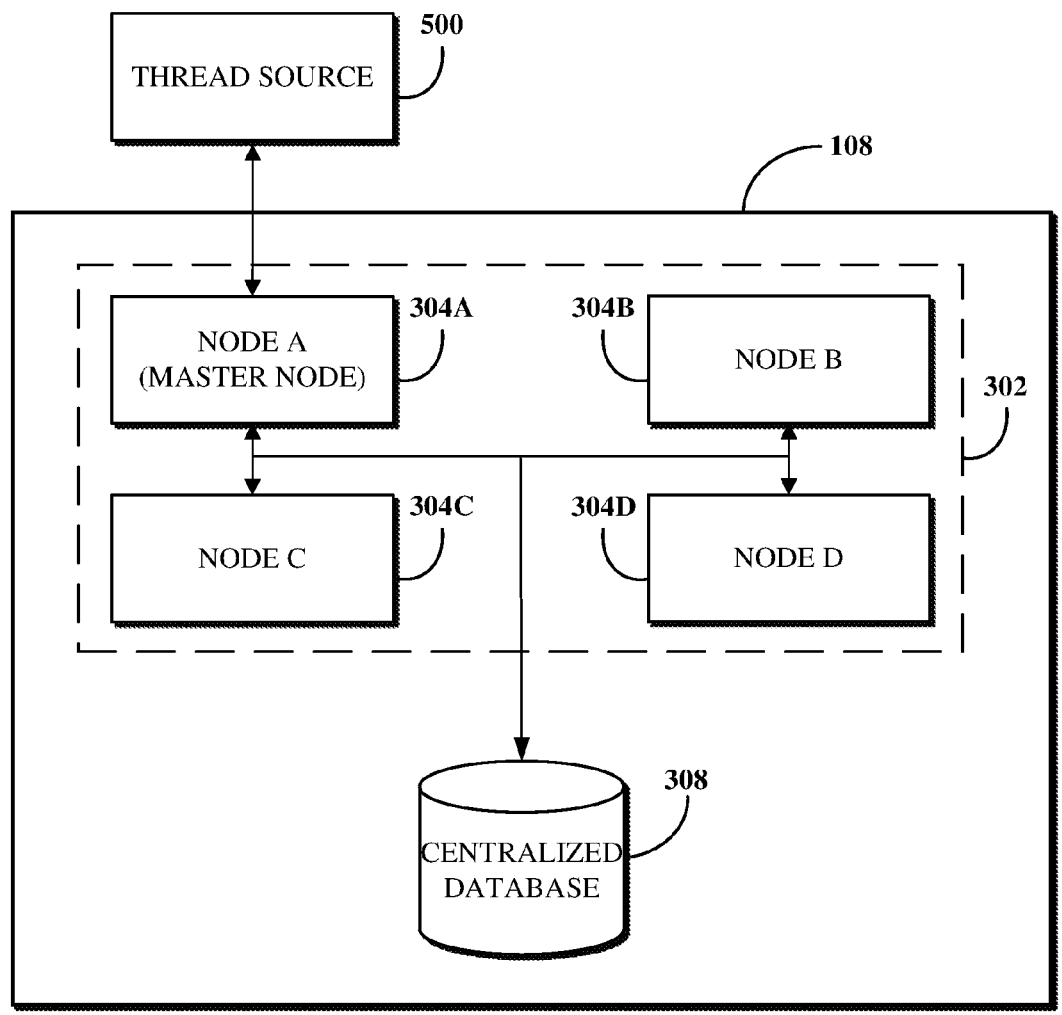
FIG. 5 is a block diagram of an example of a node cluster operating within a datacenter in accordance with implementations of this disclosure.

FIG. 5 is a block diagram of an example of a node cluster 302 operating within a datacenter 108 in accordance with implementations of this disclosure. A master node of the node cluster 302 delegates threads to be executed by the nodes of the node cluster. A source of the threads, e.g., a thread source 500, can be an archive file such as a Java Archive or a Web Archive, other files associated with an application implemented by the node cluster 302, files associated with instantiating the application implemented by the node cluster 302, or other files or records directly or indirectly related to the execution of the application within the system 100 shown in FIG. 1, or combinations thereof. The thread source 500 can access the centralized database 118 to identify the master node 304A of the node cluster 302 responsible for delegating threads for execution by the node cluster. In some implementations, the thread source 500 can include a module for retrieving information for identifying the master node of the node cluster 302 from the centralized database 118. The thread source 500 is shown in FIG. 5 as in communication with the node 304A because the node 304A is the master node; however, the thread source 500 can instead communicate with another node that is designated as the master node of the node cluster 302, for example, responsive to a different node of the node cluster 302 being designated as a new master node thereof.

The nodes 304A, 304B, 304C, 304D of the node cluster 302 can transmit messages such as access requests to one another to determine whether any other nodes of the node cluster 302 are not accessible at a given time. The access request can include a request for a response from the node to which the request was transmitted. If a response is received, the node to which the request was transmitted is determined to be accessible. If no response is received, the node to which the request was transmitted is determined to be not accessible. In some implementations, a node can transmit an access request to another node on a periodic basis (e.g., every one minute), in response to an event (e.g., a new node registering to the centralized database 308), or on another basis.

In some implementations, if no response is received, the node to which the request was transmitted can be placed on probation. For example, a probation indicator, such as a flag or single character variable, can be set to "1" or "Y" to indicate the probationary status of the node. The probation indicator can be stored within a column of the database table storing information about the nodes of the node cluster 302 registered to the centralized database 308. The other nodes of the node cluster 302 can continue transmitting access requests to a node placed on probation. In the event that a response is received from the node placed on probation within a wait period (e.g., five minutes, beginning at the time at which the node was placed on probation), the probationary status of the node can be removed. However, if the wait period expires before a response is received from the node placed on probation, such node on probation can be determined to be not accessible.

In some implementations, the node that transmitted the access request that was not responded to can indicate the change in accessible status to the centralized database. For example, if the node C 304C transmits an access request to the node D 304D and the node D 304D does not respond, the node C can execute a thread to transmit a command to the centralized database to change a value of the accessible indicator for the node D 304D within a database table.

In some implementations where nodes can be placed on probation, the execution of a thread by a node to cause a value of the accessible indicator for another node of the node cluster to change can include transmitting a command to the centralized database 308 to change the value of a probation indicator for the other node, as well. For example, if the node D 304D is on probation when it is determined to be not accessible, the node C 304C can execute a thread to change both the access indicator and the probation indicator of the node D 304D to "0," "N," or the like within the database table of the centralized database 308.

For example, the nodes A 304A, B 304B, C 304C, and D 304D can have registered to the centralized database 308 in that order. The node A 304A is therefore the first node to be designated as the master node of the node cluster 302. The node B 304B can transmit access requests to the nodes A 304A, C 304C, and D 304D. In the event that the nodes C 304C and D 304D both transmit a response to their respective access requests, but the node A 304A does not, the node B 304B can determine that the nodes C 304C and D 304D are both accessible, and it can also cause the node A 304A to be placed on probation. If the node A 304A does not respond to any further access requests transmitted to it before the expiration of a wait period, and the node C 304C is the next node of the node cluster 302 to transmit an access request to the node A 304A after the wait period expires, then the node C 304C can execute a thread to transmit a command to the centralized database 308 to indicate that the node A 304A is not accessible.

Responsive to determining that another node of the node cluster 302 is not accessible, a node 304A, 304B, 304C, 304D can execute a thread to retrieve a master designation indication for another node from the centralized database 308. Because the database table includes a row entry for individual nodes of the node cluster 302 registered to the centralized database 308, the node executing the thread has visibility into the other nodes of the node cluster 302. In some implementations, executing the thread can include querying a database table corresponding to the node cluster 302 within the centralized database 308 for a value of the master indicator of such other node.

In the event that the value of the master indicator for the not-accessible node indicates that such other node is designated as the master node, the node that executed the querying thread can execute another thread to retrieve a node identifier for a candidate master node that has priority to become a new master node for the node cluster 302. In some implementations, executing such other thread can include querying the database table for a node identifier stored in a row entry immediately following a row entry representing the current, not-accessible master node.

In the event that the queried node identifier does not match the node identifier of the node that executed the thread, the thread terminates without further action. However, in the event that the queried node identifier matches the node identifier of the node that executed the thread, such node can become a new master node of the node cluster 302. In some implementations, such node becomes the new master node of the node cluster 302 by executing another thread to update the centralized database 308 to reflect the new master node designation.

Returning to the previous example, responsive to determining that the node A 304A is not accessible, the node C 304C can then execute a thread to query the centralized database 308 for a value of a master indicator of the node A 304A. Because the node A 304A is currently the master node of the node cluster 302, the query will return a "1," "Y," or like value indicating that the node A 304A is the master node. The node C 304C can then execute another thread to query the centralized database 308 for a node identifier of a candidate master node, that is, the next node to have registered to the centralized database 308 after the node A 304A. The query can return the node identifier of the node B 304B. The node C 304C can execute another thread to determine whether its node identifier matches the queried node identifier. The thread accordingly terminates because the queried node identifier is not the node identifier of the node C 304C. However, the node B 304B can transmit an access request to the node A 304A, and, responsive to not receiving a response to the access request, execute threads to determine that the node A 304A is the current master node of the node cluster 302, determine that the node identifier of the candidate master node is its node identifier, and update the centralized database 308 to reflect that it is the new master node of the node cluster 302.

In some implementations, executing a thread to update the centralized database 308 can include the node executing the thread transmitting a command to remove the master node designation for the then-current master node from the centralized database 308, for example, by changing the value of the master indicator for the then-current master node to "0," "N," or the like within the corresponding database table. In some implementations, executing such other thread can include the node executing the thread transmitting a command to add a master node designation for itself to the centralized database 308, for example, by changing the value of its own master indicator to "1," "Y," or the like within the corresponding database table.

Implementations of the nodes 304A, 304B, 304C, 304D depicted in FIG. 5 can include additional, fewer, combined, or different functionality than as described above. For example, in some implementations, a single thread can be executed to retrieve master indicators for respective nodes of the node cluster, compare node identifiers to determine master node candidacy, and update the centralized database 308 responsive to determining that the node executing the thread is next in priority order to become a master node of the node cluster. In another example, in some implementations where the nodes 304A, 304B, 304C, 304D are database nodes, the nodes 304A, 304B, 304C, 304D can store information and status indicators for respective nodes within databases local to the nodes (e.g., the node 304A can store information and status indicators for itself within a database operated in connection with the node 304A). The nodes 304A, 304B, 304C, 304D can then update the centralized database 308 to reflect changes to data locally stored for the respective nodes. In another example, a server on which the nodes 304A, 304B, 304C, 304D execute can be reset in the event that no master node of the node cluster 302 can be identified (e.g., where each of the nodes 304A, 304B, 304C, 304D is in a fail state). Resetting the server can include terminating the nodes 304A, 304B, 304C, 304D and subsequently re-executing them after the server has been rebooted.

Figure 6:
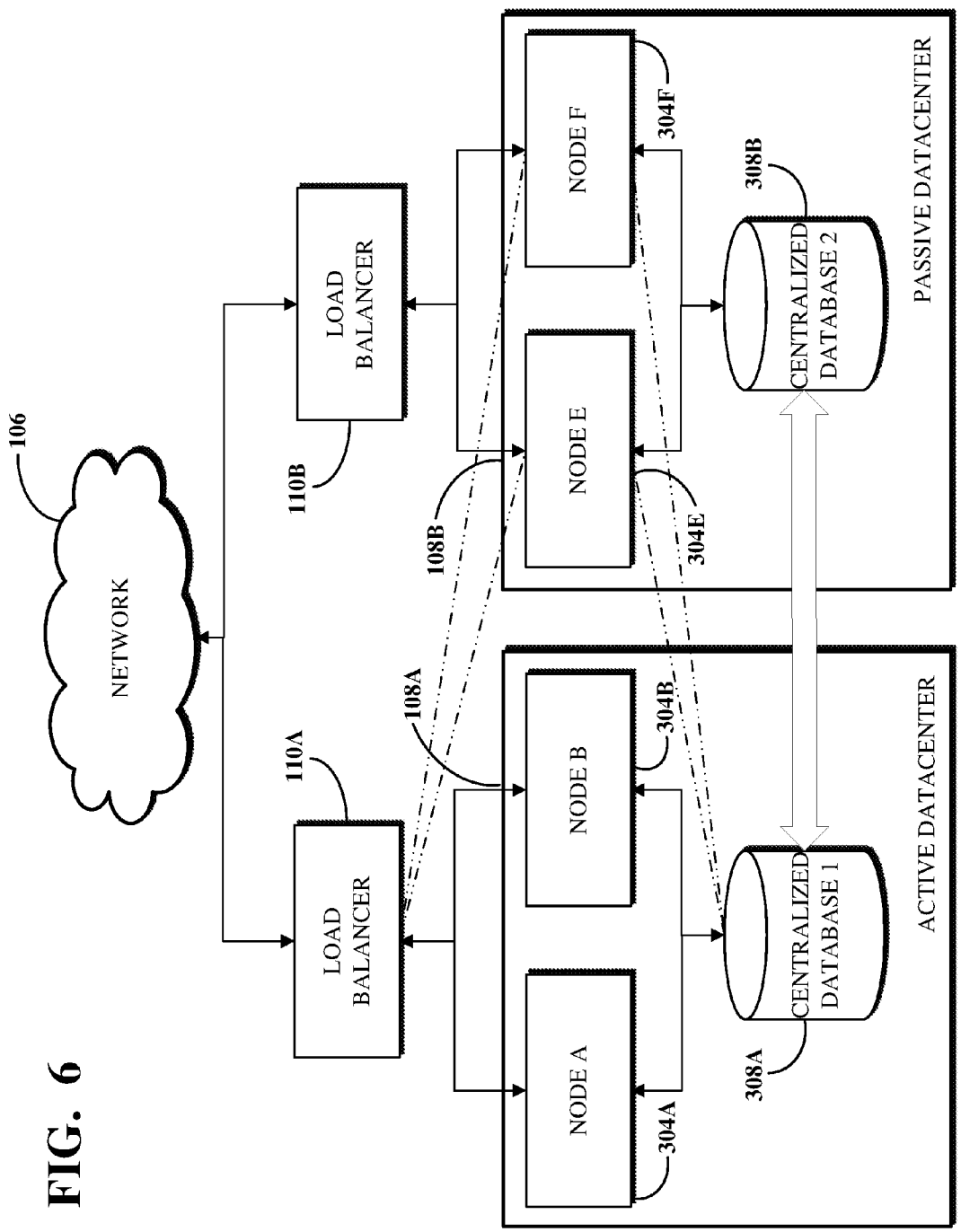
FIG. 6 shows an example of a failover between an active datacenter and a passive datacenter in accordance with implementations of this disclosure.

FIG. 6 shows an example of a failover between an active datacenter 108A and a passive datacenter 108B in accordance with implementations of this disclosure. Generally, a master node failure is resolved over a network, such as the network 106 discussed with respect to FIG. 1, by designating another node of the node cluster as a new master node for the node cluster. In some implementations where the nodes of the node cluster are both not accessible, other nodes executed within the datacenter in which the node cluster operates can be leveraged to resolve a master node failure. That is, there may be redundant nodes executed within such datacenter to use as backup nodes in the event that the entire node cluster is not accessible. However, where the nodes capable of delivering services in connection with an application are both not accessible within the datacenter in which such nodes are executed, a master node failure can be resolved using nodes executed within a different datacenter. As such, in the event of a complete failure at an active datacenter 108A that results in all of the nodes executed there being not accessible (e.g., where the power to the active datacenter 108A has gone out), nodes at a passive datacenter 108B can be leveraged to deliver services associated with the application via a process generally referred to herein as a failover.

For example, there may be four nodes executed in a first datacenter located in San Jose, Calif. and four nodes in a second datacenter in Washington, D.C. The centralized database active for the services to be delivered may be in San Jose, and so the San Jose datacenter can be referred to as the "active" datacenter. Even though there are eight application nodes total between the two datacenters, only four nodes are executed in the active datacenter such that the election of a master node can only be between the four nodes in the active datacenter. However, in the event that all four nodes at the active datacenter are not accessible, the nodes at the passive datacenter (e.g., the Washington, D.C. datacenter) can be used for delivering the services.

Typically, a first load balancer 110A operating as a global traffic manager can direct clients to the nodes 304A, 304B in an active datacenter 108A for delivering services associated with an application executed by servers of the active datacenter 108A and using the centralized database 308A. Separately, a second load balancer 110B can direct clients requesting services associated with an application executed by servers of the passive datacenter 108B to the nodes 304E, 304F executed in the passive datacenter 108B and using the centralized database 308B. However, in some implementations, failover logic can cause the first load balancer 110A to redirect clients to the nodes 304E, 304F in the passive datacenter 108B for services associated with the corresponding application. In this way, the nodes 304E, 304F of the passive datacenter 108B effectively become active nodes for delivering services associated with the application.

Responsive to a failover occurring, the nodes 304E, 304F of the passive datacenter 108B can register to the centralized database 308A. The first of the passive datacenter nodes to register to the centralized database 308A can be the first node of the passive datacenter 108B to be designated as the master node per the failover. In some implementations, information associated with the application processed using the nodes 304A, 304B can be copied to the centralized database 308B such that, in the event of a failover, the nodes 304E, 304F can register to the centralized database 308B instead of the centralized database 308A. For example, the nodes 304E, 304F registering to a database operating within the same datacenter as where the nodes 304E, 304F are executed can reduce network latency otherwise resulting from the nodes 304E, 304F registering to a database operating within a different datacenter. The failover logic can be automated such that it may not include manual user action for the service delivery to switch over to the passive datacenter 108B.

The failover can be a temporary solution used while the nodes 304A, 304B of the active datacenter 108A remain not accessible. Thus, when the nodes 304A, 304B of the active datacenter 108A become accessible (e.g., the hardware was reset or power returned to the datacenter), a message can be sent to the first load balancer 110A to cause it to redirect client traffic to the active datacenter 108A. In some implementations, redirecting client traffic in this way can include revoking a master node designation of a node of the passive datacenter 108B then-currently designated as the master node. The first node of the active datacenter 108A to re-register to the centralized database 308A can then be designated as the new master node.

In some implementations, some scheduled jobs can be configured to allocate dedicated threads that are guaranteed to execute on the nodes of an active datacenter 108A. To the extent the nodes of the active datacenter 108A are not accessible, the scheduled jobs can be configured to allocate dedicated threads that are guaranteed to execute on applications nearby to the active datacenter 108A, for example, within the passive datacenter 108B. After the failover has been reverted such that the nodes of the active datacenter 108A are once again delivering the services associated with the subject application, these scheduled jobs can regenerate dedicated threads for the re-registered nodes of the active datacenter 108A.

Figure 7:
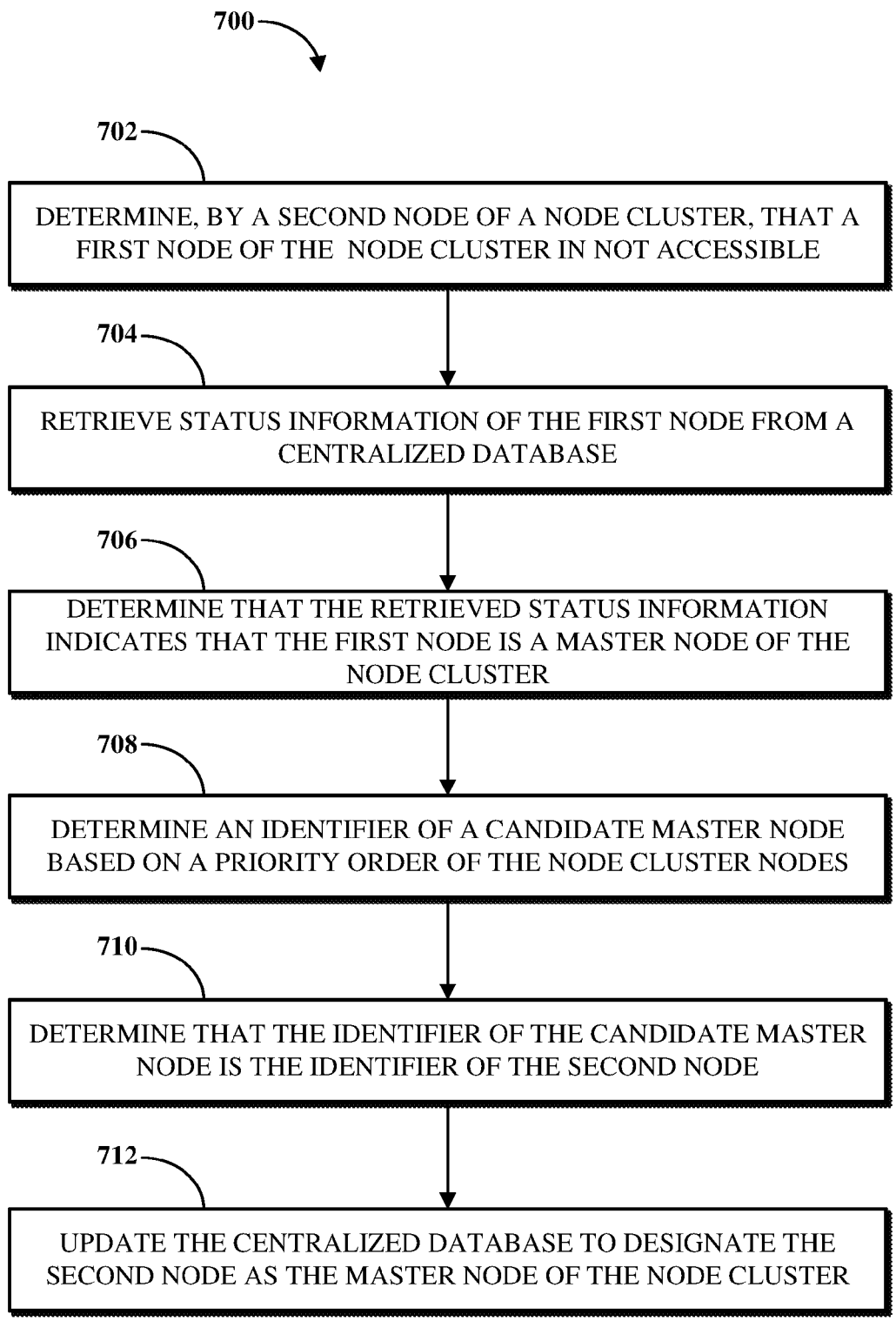
FIG. 7 is a flowchart illustrating an example of a technique for resolving master node failures within node clusters.

FIG. 7 is a flowchart illustrating an example of a technique 700 for resolving master node failures within node clusters. In some implementations, the technique 700 can be executed using computing devices, such as the systems, modules, or devices described with respect to FIGS. 1 through 6. In some implementations, the technique 700 can be performed, for example, by executing a machine-readable program or other computer-executable instructions, such as instructions or programs described according to JavaScript, C, or other such instructions. The steps, or operations, of the technique 700 or any other method, process, or algorithm described in connection with the implementations disclosed herein can be implemented directly in hardware, firmware, software executed by hardware, circuitry, or a combination thereof.

The technique 700 can begin at operation 702 by a second node of a node cluster determining that a first node of the node cluster is not accessible. In some implementations, the second node of the node cluster can transmit an access request to the first node as part of a periodic process for assessing the health and activity of nodes executed at the datacenter. If the datacenter utilizes a probation policy for nodes that do not immediately respond to access requests and the first node does not respond to the access request transmitted by the second node, the first node can be placed on probation for a wait period. If the first node does not respond to any further access requests by the second node (or other nodes of the corresponding node cluster) before the expiration of the wait period, the first node can be determined to be not accessible by the second node. If the datacenter does not utilize a probation policy and the first node does not respond to the original access request, the first node can still be determined to be not accessible by the second node.

At operation 704, and in response to determining that the first node is not accessible, the second node can execute a thread to retrieve status information of the first node from a centralized database accessible by the nodes of the node cluster including the first node and the second node. In some implementations, the retrieved status information of the first node can include a master indicator indicating whether the first node is a master node of the node cluster. In some implementations, the status information of the first node can be retrieved from the centralized database by the executed thread including querying a database table of the centralized database for a value of the master indicator. At operation 706, the retrieved status information can be evaluated to determine whether the first node is the master node of the node cluster. In some implementations, the retrieved status information can be programmatically evaluated (e.g., as input into a program function) to determine whether the value retrieved for the status information indicates that the first node is the master node. For example, if the retrieved value is a "1," "Y," or the like, it can be determined that the first node is the master node.

At operation 708, an identifier of a candidate master node having priority to become a new master node of the node cluster can be determined based on a priority order of the nodes of the node cluster. In some implementations, the priority order for designating a new master node of the node cluster can be indicated based on an order in which the nodes of the node cluster registered to the centralized database. Accordingly, in some implementations, the identifier of the candidate master node can be determined by the second node executing a thread to query the database table within the centralized database for a value of a node identifier in a row entry immediately below the row entry representing the first node. At operation 710, the identifier of the candidate master node can be determined to be the identifier of the second node. In some implementations, the determination that the identifier of the second node is the identifier of the candidate master node can be made by the second node executing a thread to compare its identifier to the identifier queried at operation 708.

At operation 712, and responsive to the identifier of the candidate master node being determined to be the identifier of the second node, the centralized database can be updated to designate the second node as the new master node of the node cluster. In some implementations, updating the centralized database to designate the second node as the new master node of the node cluster can include changing values of the master indicator of the first node and the second node within the database table. For example, the value of the master indicator of the first node can be changed from "1," "Y," or the like to "0," "N," or the like to reflect that the master node designation has been removed from the first node. Similarly, the value of the master indicator of the second node can be changed from "0," "N," or the like to "1," "Y," or the like to reflect that the master node designation has been added to the second node.

Although the technique 700 is shown as a series of operations for clarity, implementations of the technique 700 or any other method, process, or algorithm described in connection with the implementations disclosed herein can be performed in various orders or concurrently. Additionally, operations in accordance with this disclosure can be performed with other operations not presented and described herein. Furthermore, one or more aspects of the systems and methods described herein can be omitted.

For example, in some implementations, the technique 700 can further include registering a node to the centralized database by storing an identifier and status information of the node within a row of a database table of the centralized database. For example, responsive to determining that a new node of the node cluster has registered to the centralized database, information can be stored in a new row inserted within the corresponding database table. In another example, in some implementations, the technique 700 can further include unregistering a node from the centralized database when the node is determined to be not accessible for a staleness period. For example, if a node of the node cluster is determined to be offline for more than one hour (e.g., based on a failure of the node to respond to access requests transmitted to it), a row of the database table storing information about the node cluster nodes can be deleted. In this way, the technique 700 can prevent the centralized database from storing information that could be outdated for a node. In the event that the node later comes back online and re-registers to the centralized database, then-current information about the node can be stored in a new row inserted within the corresponding database table.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized which can contain specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components, e.g., memory elements, processing elements, logic elements, look-up tables, and the like, which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with any combination of data structures, objects, processes, routines or other programming elements. Functional aspects can be implemented in algorithms that execute on one or more processors. Furthermore, the implementations of the systems and techniques could employ any number of conventional techniques for electronics configuration, signal processing or control, data processing and the like. The words "mechanism" and "element" are used broadly and are not limited to mechanical or physical implementations, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise, or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to cover both the singular and the plural unless specified otherwise or clearly indicated otherwise by the context to be directed to a singular form. Moreover, use of the term "an implementation" or the term "one implementation" throughout this disclosure is not intended to mean the same implementation or implementation unless described as such.

The particular implementations shown and described herein are illustrative examples of the systems and techniques and are not intended to otherwise limit the scope of the systems and techniques in any way. For the sake of brevity, conventional electronics, control systems, software development and other functional aspects of the systems (and components of the individual operating components of the systems) cannot be described in detail. Furthermore, the connecting lines, or connectors shown in the various figures presented are intended to represent example functional relationships or physical or logical couplings between the various elements. Many alternative or additional functional relationships, physical connections or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is merely intended to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if the references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

What is claimed is:

1. A fault tolerance system, comprising:
 a plurality of nodes, wherein each of the plurality of nodes comprises a virtual machine instance configured to execute at least a portion of an application thread group; and
 a centralized database that is accessible to each of the plurality of nodes and configured to store status information for each of the plurality of nodes, including an indication of an ordered priority of the plurality of nodes,
 wherein the plurality of nodes comprises:
  a first node having a highest priority and designated as a master node in the centralized database, wherein the master node is configured to delegate execution of the application thread group among the plurality of nodes; and
  a second node configured to:
   execute at least a portion of the application thread group based on a delegation by the first node;
   send a message to the first node;

identify a failure of the first node based on the first node failing to respond to the message;
update the status information for the first node in the centralized database to indicate that the first node is no longer the master node based on the identified failure of the first node;
identify a second highest priority node of the plurality of nodes from the ordered priority in the centralized database; and
update the status information of the second highest priority node in the centralized database to designate the second highest priority node as the master node.

2. The fault tolerance system of claim 1, wherein the message sent to the first node includes a request for a response by the first node indicating that the first node is accessible, wherein the failure of the first node is identified responsive to a determination that the first node is not accessible based on the response not being received from the first node.

3. The fault tolerance system of claim 1, wherein the ordered priority of the plurality of nodes represents an order in which each of the plurality of nodes registered to the centralized database.

4. The fault tolerance system of claim 3, wherein the centralized database is configured to register each node of the plurality of nodes to the centralized database, wherein, after registration, the centralized database is configured to store an identifier of each node within a respective entry of the centralized database.

5. The fault tolerance system of claim 4, wherein to identify the second highest priority node, the second node is configured to:
identify an identifier in a second entry of the centralized database following a first entry of the centralized database, the first entry including an identifier of the first node, wherein the identifier in the second entry is of the second node.

6. The fault tolerance system of claim 1, wherein the second node is configured to identify the failure of the first node responsive to failing to receive a response to the message within a threshold period starting at a time the message is sent to the first node.

7. A fault tolerance method for a plurality of nodes, wherein each of the plurality of nodes comprises a virtual machine instance executing at least a portion of an application thread group, and wherein each of the plurality of nodes is in communication with a centralized database that stores status information for each of the plurality of nodes, including an indication of an ordered priority of the plurality of nodes, wherein the plurality of nodes comprises:
a first node having a highest priority and designated as a master node in the centralized database, wherein the master node delegates execution of the application thread group among the plurality of nodes; and
a second node that performs the method, comprising:
executing at least a portion of the application thread group based on a delegation by the first node;
sending a message to the first node;
identifying a failure of the first node based on the first node failing to respond to the message;
updating status information for the first node in the centralized database to indicate that the first node is no longer the master node based on the identified failure of the first node;
identifying a second highest priority node of the plurality of nodes from the ordered priority in the centralized database; and
updating the status information of the second highest priority node in the centralized database to designate the second highest priority node as the master node.

8. The fault tolerance method of claim 7, wherein the message sent to the first node includes a request for a response by the first node indicating that the first node is accessible, wherein the failure of the first node is identified responsive to determining that the first node is not accessible based on the response not being received from the first node.

9. The fault tolerance method of claim 7, wherein the ordered priority of the plurality of nodes represents an order in which each of the plurality of nodes registered to the centralized database.

10. The fault tolerance method of claim 9, wherein each node of the plurality of nodes registers to the centralized database, and wherein, after registration, the centralized database stores an identifier of each node within a respective entry of the centralized database.

11. The fault tolerance method of claim 10, wherein identifying the second highest priority node comprises:
identifying an identifier in a second entry of the centralized database following a first entry of the centralized database, the first entry including an identifier of the first node, wherein the identifier in the second entry is of the second node.

12. The fault tolerance method of claim 7, wherein identifying the second highest priority node comprises:
identifying the second node as the second highest priority node from the ordered priority in the centralized database.

13. The fault tolerance method of claim 7, wherein identifying the failure of the first node comprises:
determining that a response has not been received from the first node within a threshold period starting at a time the message is sent to the first node.

14. A non-transitory computer-readable storage medium, comprising executable instructions that, when executed by a processor, facilitate the performance of operations for fault tolerance for a plurality of nodes, wherein each of the plurality of nodes is comprises virtual machine instance configured to execute at least a portion of an application thread group, and wherein each of the plurality of nodes is communicatively coupled to a centralized database that stores status information for each of the nodes, including an indication of an ordered priority of the plurality of nodes, wherein the plurality of nodes comprises a first node having a highest priority and designated as a master node in the centralized database, wherein the master node delegates execution of the application thread group among the plurality of nodes; the instructions comprising:
instructions that cause a second node of the plurality of nodes to execute at least a portion of the application thread group based on a delegation by the first node;
instructions that cause the second node to send a message to the first node;
instructions that cause the second node to identify a failure of the first node based on the first node failing to respond to the message;
instructions that cause the second node to update the status information for the first node in the centralized database to indicate that the first node is no longer the master node based on the identified failure of the first node;
instructions that cause the second node to identify a second highest priority node of the plurality of nodes from the ordered priority in the centralized database; and instructions that cause the second node to update the status information of the second highest priority node in the centralized database to designate the second highest priority node as the master node.

15. The non-transitory computer-readable storage medium of claim 14, wherein the message sent to the first node includes a request for a response by the first node indicating that the first node is accessible, wherein the failure of the first node is identified responsive to determining that the first node is not accessible based on the response not being received from the first node.

16. The non-transitory computer-readable storage medium of claim 15, wherein each node of the plurality of nodes registers to the centralized database, wherein, after registration, the centralized database stores an identifier of each node within a respective entry of the centralized database.

17. The non-transitory computer-readable storage medium of claim 16, wherein the instructions for the second node to identify a second highest priority node comprise:
instructions that cause the second node to identify an identifier in a second entry of the centralized database following a first entry of the centralized database, the first entry including an identifier of the first node, wherein the identifier in the second entry is of the second node.

18. The non-transitory computer-readable storage medium of claim 14, wherein the instructions to identify the second highest priority node comprise:
instructions that cause the second node to identify itself as the second highest priority node from the ordered priority in the centralized database.

19. The non-transitory computer-readable storage medium of claim 14, wherein instructions to identify the failure of the first node comprises:
instructions that cause the second node to determine that a response has not been received from the first node within a threshold period starting at a time the message is sent to the first node.

20. The fault tolerance system of claim 1, comprising:
an application server configured to host the plurality of nodes, wherein the first and second nodes comprise instructions stored in a memory of the application server and executed by a processor of the application server; and
a database server communicatively coupled to the application server and configured to host the centralized database.

* * * * *